(12) United States Patent
Ward

(10) Patent No.: US 6,342,118 B1
(45) Date of Patent: Jan. 29, 2002

(54) HEAT SPLICER AND HEAT-SEAL SPLICING METHOD

(75) Inventor: James K. Ward, Rockton, IL (US)

(73) Assignee: Martin Automatic Inc., Rockford, IL (US)

( * ) Notice: Subject to any disclaimer, the term of this patent is extended or adjusted under 35 U.S.C. 154(b) by 0 days.

(21) Appl. No.: 09/526,319

(22) Filed: Mar. 15, 2000

(51) Int. Cl.[7] ............................................... B65H 69/06
(52) U.S. Cl. ...................... 156/159; 156/157; 156/502
(58) Field of Search ............................... 156/157, 159, 156/267, 308.2, 502, 510, 515, 530; 242/556

(56) References Cited

U.S. PATENT DOCUMENTS

| | | | |
|---|---|---|---|
| 3,769,124 A | * 10/1973 | Johnson | 156/159 |
| 4,859,270 A | * 8/1989 | Martin et al. | 156/361 |
| 4,923,546 A | * 5/1990 | Wheeler et al. | 156/159 |
| 5,514,237 A | * 5/1996 | Emenaker et al. | 156/159 |
| 5,669,998 A | * 9/1997 | Ward et al. | 156/159 |

FOREIGN PATENT DOCUMENTS

DE 39 40 777 A1 * 6/1991

* cited by examiner

Primary Examiner—James Sells
(74) Attorney, Agent, or Firm—McAndrews, Held & Malloy, Ltd.

(57) ABSTRACT

A method and apparatus for heat-seal splicing a trailing end of a first plastic web and a leading end of a second web. The apparatus includes a traverse cylinder actuated pulley system that is disposed transverse to the longitudinal axes of the web ends. The pulley system moves a shuttle that is attached to and that carries a spring biased wheel. In operation, the wheel is moved in either direction across the web ends and between the two ramps. The wheel is spring biased into contact with a heated sealing wire that, in turn, is brought into web sealing contact with sequential portions of web ends as the wheel is moved transversely across the web ends from one webs' side edges to the other webs' side edges and along the sealing wire so as to heat-seal splice the web ends.

10 Claims, 7 Drawing Sheets

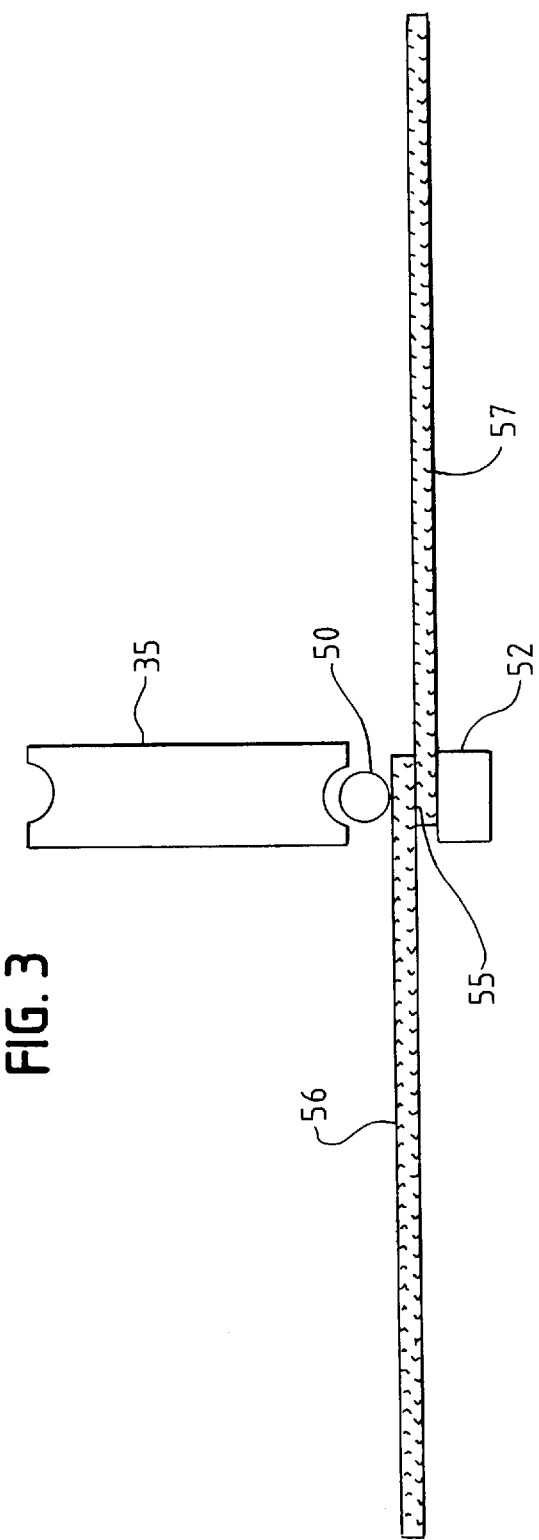
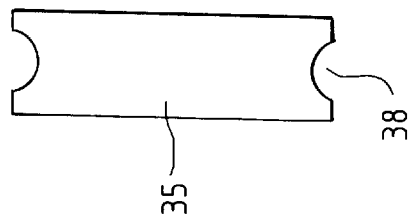
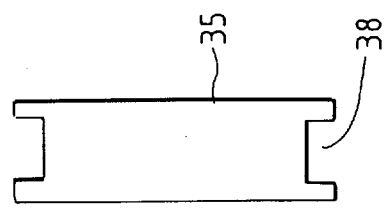
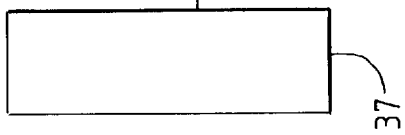

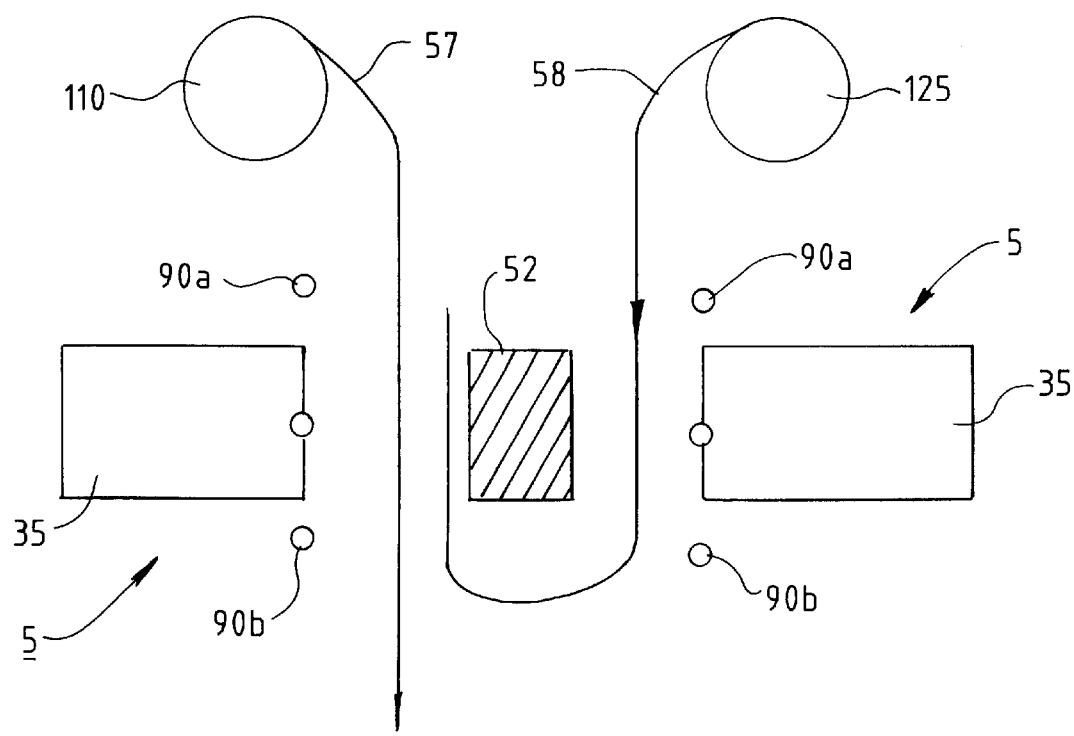

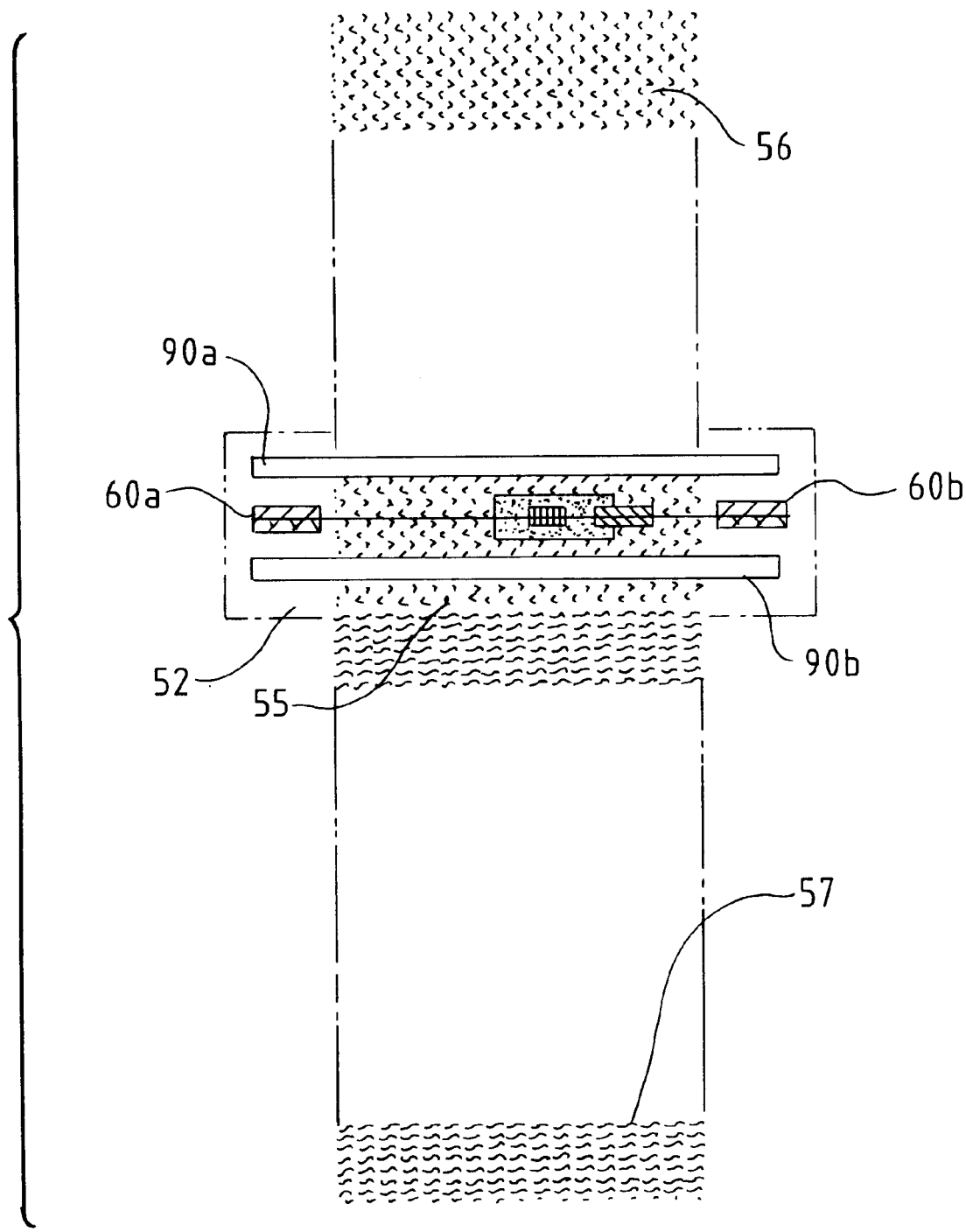

HEAT SPLICER AND HEAT-SEAL SPLICING METHOD

CROSS REFERENCE TO RELATED APPLICATIONS (NOT APPLICABLE)

STATEMENT REGARDING FEDERALLY SPONSORED RESEARCH OR DEVELOPMENT (NOT APPLICABLE)

BACKGROUND OF THE INVENTION

This invention relates to the splicing together of webs made of two plastic materials. More particularly, the present invention relates to an improved method and a web splice assembly or machine for repeatedly heat-seal splicing the trailing end of a first, two-sided plastic material web and the leading end of a second, two-sided plastic material web together; then when the second web is running, for heat-seal splicing the trailing end of the second web and the leading end of a third, two-sided plastic material web together; and so forth.

Web splicers have been used in the past in the manufacture of disposable diapers, which are made, in part, by combining webs of various materials, one on top of another, in a relatively high speed, continuous manufacturing process. The combined webs include polyethylene, and various absorbent and hydrophilic inner liners that have different modula of elasticity and that readily inelastically deform under even low tensions. Additionally, two-sided plastic material webs may be used. In this regard, one surface of a low density polyethylene web may be "rougher" than the other surface because of micro-embossing. When such two-sided webs are to be spliced, it is important that after splicing, like or similar surfaces face in the same direction when the webs run through a subsequent process.

Splices are usually accomplished by tape splicing machines that applied tape to abutted leading and trailing ends of the webs to be spliced. As a practical matter, there is no reliable way of quickly determining, downstream, which diaper(s) includes the taped splice. Consequently, a significant number of diapers are conventionally discarded after each splice to avoid the commercially unacceptable packaging of diapers containing a taped splice.

Splicing machines, which utilize heat-seal splicing techniques instead of tape splicing techniques, have also been employed to splice two-sided plastic material webs. While such machines have the obvious advantage of eliminating the tape, these heat-seal splicing machines require a controlled temperature element adjacent to the webs to be spliced in order to form a heat-seal bond between the webs. The element must be carefully maintained at a predetermined temperature. This typically requires temperature feedback systems to monitor and control the splicing temperature of the heated element. Such control systems are relatively expensive and complicated and require frequent maintenance. Even so, the resulting heat-seal splices often include "tails" or small pieces of the webs adjacent to the location of the splice. Disposable diapers, for example, that include splices having such "tails" are commercially unacceptable, and thus again, a number of disposable diapers may have to be discarded each time a splice is made.

U.S. Pat. No. 4,923,546 is directed to a relatively high speed, web-processing operation, such as a disposable diaper manufacturing line. The patent describes a method and apparatus comprising a splice wheel arm assembly for forming a butt splice to join together a web from a new roll of material to a web that is from an expiring roll of material. To form the butt splice, the leading end of the new web is trimmed by moving one knife wheel assembly along the cutting edge of an anvil. The use of adhesive tape presents problems downstream since the tape must not be in the final consumer product.

U.S. Pat. No. 4,859,270 discloses a web splicing apparatus and method to lap splice together the leading end of a web from a new roll and the trailing end of a web from an expiring roll running under tension and at a relatively high speed, where the new and expiring webs each have identical, spaced, regularly repeating patterns. Securing means, typically pieces of adhesive tape, are used to accomplish the splice.

U.S. Pat. No. 5,514,237 is directed to a method and apparatus for continuously heat splicing thermoplastic webbing. First and second webs of a thermoplastic material are held stationary and heat spliced together by bringing together first and second opposable splicer clamps to form an overlapping area between the first and second webs and by applying a heat impulse to the overlapping area so as to bond the webs together. The overlapping webs are heat bonded in one step, and this requires an expensive heat-splice device.

U.S. Pat. No. 5,669,998, which is assigned to the assignee of the present application, describes a web splicing assembly and method for heat splicing together two webs, addresses the problem of the downstream discarding of disposable diapers every time a splice is made, and is hereby incorporated by reference in its entirety. The disclosed web splicing assembly includes first and second splicing sub-assemblies that are used for heat-seal splicing the trailing end of a first, two-sided plastic material web and the leading end of a second, two-sided plastic material web together; and then after the second web has run, for heat-seal splicing the trailing end of the second web and the leading end of a third, two-sided plastic material web together. The first and second sub-assemblies each have a relatively movable slide bar and a relatively fixed nip bar. The sub-assemblies are each movable between first and second positions. Each slide bar carries a heated wire that heat severs the clamped webs and heat-seals the clamped webs together.

While the apparatus and method disclosed in U.S. Pat. No. 5,669,998 represents a significant step in the development of the art of splicing together web material, there are still problems that need to be addressed. The use of long slide bars for heat-seal splicing together two wider webs can lead to undesirable slide bar flexing and bending problems that can lead to a non-uniform heat-seal splice. To minimize the bar flexing problem, a plurality of pneumatic cylinders are coupled to the slide bar assembly to keep the bar straight. These pneumatic cylinders add to the maintenance and running cost of the web splicing assemblies. Thus, there has been a longstanding need for a simpler apparatus and method for heat-seal splicing two webs together.

SUMMARY OF THE INVENTION

Accordingly, a principal object of this invention is to provide an improved, simpler apparatus and method for heat-seal splicing together two webs.

Another object is to provide a heat-seal splice apparatus and method that minimizes the requirement for bulky and expensive pneumatic cylinders and that avoids the non-uniform heat-seal splice problem.

The present invention provides a method for heat-splicing together a trailing end of a first two-sided plastic material web and a leading end of a second two-sided plastic material web. More particularly, the preferred embodiment of the method comprises the steps of: providing a first plastic material web, which web is wound in a rotatable roll; providing a leading end of a second plastic material web, which web is wound in a rotatable roll; clamping together the first plastic material web and the leading end of a second plastic material web; and bringing a heated sealing wire into momentary contact with sequential, transverse portions of the clamped web ends, starting with a portion adjacent to one side edge of the clamped web ends and continuing transversely across the clamped web ends, to heat seal weld clamped web ends together and to sever the trailing end of first web from the first web roll. The method of the present invention is especially suited for heat splicing two-sided plastic material webs and for heat splicing relatively wide webs.

The present invention further provides an apparatus for heat-splicing a trailing end of a first plastic material web, which is wound in a rotatable roll, and a leading end of a second plastic material web, which is wound in another rotatable roll. More specifically, the preferred embodiment of the improved apparatus of the present invention comprises: a traverse cylinder that is attached to a pulley system; a shuttle attached to the pulley system; a movable element attached to the shuttle; a heated sealing wire of sufficient length to traverse the width of the ends of the first and second of the webs to be spliced, the heated sealing wire being disposed in proximity to the movable element; and a spring to bias the movable element into contact with the heated sealing wire and thereby into contact with sequential portions of the web ends, starting with a portion adjacent one side edges of the web ends and continuing transversely across the web end to the other side of the web ends.

The above mentioned and other features of this invention and the manner of obtaining them will become more apparent, and the invention itself will be best understood, by reference to the following drawings taken in conjunction with the accompanying description of preferred embodiments.

BRIEF DESCRIPTION OF THE SEVERAL VIEWS OF THE DRAWINGS

The following is a brief description of the drawings which are presented for the purposes of illustrating preferred embodiments of the invention and not for purposes of limiting the same:

FIG. 3 is a fragmentary cross-sectional view taken along the line 3—3 in FIG. 1;

FIG. 4 is a fragmentary schematic cross-sectional view of a wheel according to another embodiment of the invention;

FIG. 5 is a fragmentary schematic cross-sectional view of a wheel according to another embodiment of the invention;

FIG. 6 is a fragmentary schematic cross-sectional view of a wheel according to another embodiment of the invention;

FIG. 12 is a fragmentary schematic cross-sectional view of a heat-seal splicing assembly according to still another embodiment of the invention; and FIG. 13 is a fragmentary schematic top view of a heat-seal splicing assembly according to another embodiment of the invention;

DETAILED DESCRIPTION OF THE PREFERRED EMBODIMENTS OF THE INVENTION

While the invention will be described in connection with one or more preferred embodiments, it will be understood that the invention is not limited to those embodiments. On the contrary, the invention includes all alternatives, modifications, and equivalents as may be included within the spirit and scope of the appended claims.

Figure 1:
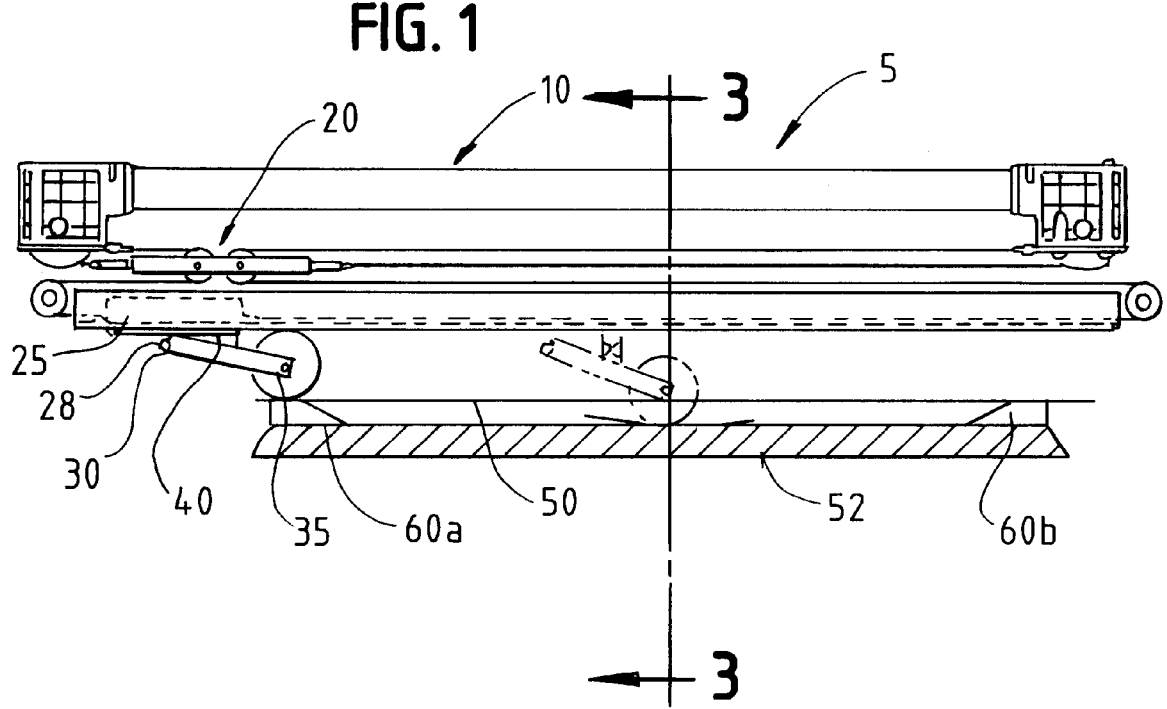
FIG. 1 is a schematic cross-sectional view of a heat-seal splicing assembly according to one aspect of the invention.

As illustrated in FIG. 1, a heat-splice assembly 5 comprises a traverse cylinder 10 that is attached to a pulley system 20. The pulley system 20 is attached to a shuttle 25. The shuttle 25 is attached to a mobile element, rolling back-up wheel 35, by means of a wheel attachment 30 and a biasing means, spring 40. The attachment 30 is able to rotate about pivot 28. The spring 40 is held in compression and thereby applies a biasing force on wheel 35. When not in use the wheel 35 is parked on ramps 60a or 60b that are located on opposite sides of a back-up bar 52. In deployed mode, the wheel 35 is pushed by shuttle 25, which is itself driven by the pulley system 20, in either transverse direction between ramps 60a and 60b.

The wheel 35 is shown in a resting position atop a ramp 60a and in a deployed position moving between ramp 60a and 60b. Sufficient tension is applied to the sealing wire 50 to keep it aloft of or above the back-up bar when the mobile element, here the wheel 35, is parked in a resting position on ramp 60a or 60b. A traverse cylinder 10 drives the pulley system 20 to move the shuttle 25 from a position adjacent to ramp 60a to a second position adjacent to ramp 60b. The shuttle 25 drives the wheel 35 off the ramp 60a. The wheel 35 is pulled along atop of the sealing wire 50 and towards a second rest position atop ramp 60b.

The force in spring 40 provides a biasing force that acts on wheel 35. More particularly, as the wheel 35 is driven down off the ramp 60a, spring 40 forces the wheel 35 into direct contact with the sealing wire 50 causing the wire 50 to come into direct contact with a portion of overlapping webbing 55 (not shown in FIG. 1). The webbing 55 is preferably clamped against back-up bar 52 before the wheel 35 leaves the ramp 60a. The wheel 35 is directed along the sealing wire 50 causing a splicing and weld action in sequential portions of the overlapped webbing 55 as the wheel 35 is moved (moves) across the webbing from one side edge to the other side edge of the webbing. At the end of its transverse of the webbing 55, the wheel 35 is parked on ramp 60*b*. When required, the pulley system 20 can then be operated in reverse causing the shuttle 25 to drag the wheel 35 back towards and onto the ramp 60*a*. The spring 40 again forces the wheel to push the sealing wire into contact with sequential portions of the webbing 55 to make a heat-splice across the next set of webbing to be spliced, that is, to webbing, which is successor to webbing 55.

During each subsequent backwards and forwards transverse movement of the wheel 35 across successor portions of overlapping webbing 55, the heated sealing wire 50 splices the leading and trailing ends of the webs together so that the spliced trailing end and leading ends can, when unclamped, move together in a direction parallel to the longitudinal axis of the webs at the same time, the wire 50 also severs the clamped web portions along a localized area that extends across the webs so that the trailing end is severed from its roll.

The tautness of the sealing wire 50 and the force of the spring 40 should be suitably matched so that when the wheel 35 is rolled off ramp 60*a* or 60*b* the force of the spring 40 is sufficient to cause the wheel 35 to push sealing wire 50 into contact with the adjacent portion of webbing 55. In normal operation the sealing wire 50 is at a sufficiently high temperature that when it is brought into contact with the webbing 55, a weld and severing action occurs along a contact line defined by the path taken by the rolling wheel 35 across the webbing 55. The spring bias on the wheel 35, provided by the spring 40, together with the temperature of the sealing wire 50 serve to provide a good heat-seal splice.

The sealing wire 50 can be held in position by a conventional means such as a pair of conventional, spring steel mounting and conductor assemblies (not shown) that are connected with the ends of the sealing wire 50 located adjacent to each ramp 60. The particular type of sealing wire 50 that may be employed in the present invention is not critical although a TEFLON™ coated wire is suitable. The wire 50 may be a 0.7 mm TEFLON™ coated wire.

The wire 50 is connected, in a conventional manner, to a conventional source of electrical power such that the wire may be heated to a temperature in excess of the melting temperature of the plastic material of the webs to be spliced. Conventional control means, not shown, controls the temperature of the wire in a conventional manner. As noted above, what is important is not the degree of control, but rather that the temperature control means is capable of heating the wire 50 to a preselected temperature which is generally above that needed to melt, relatively quickly, the plastic material of which the webs to be spliced are made.

Figure 2:
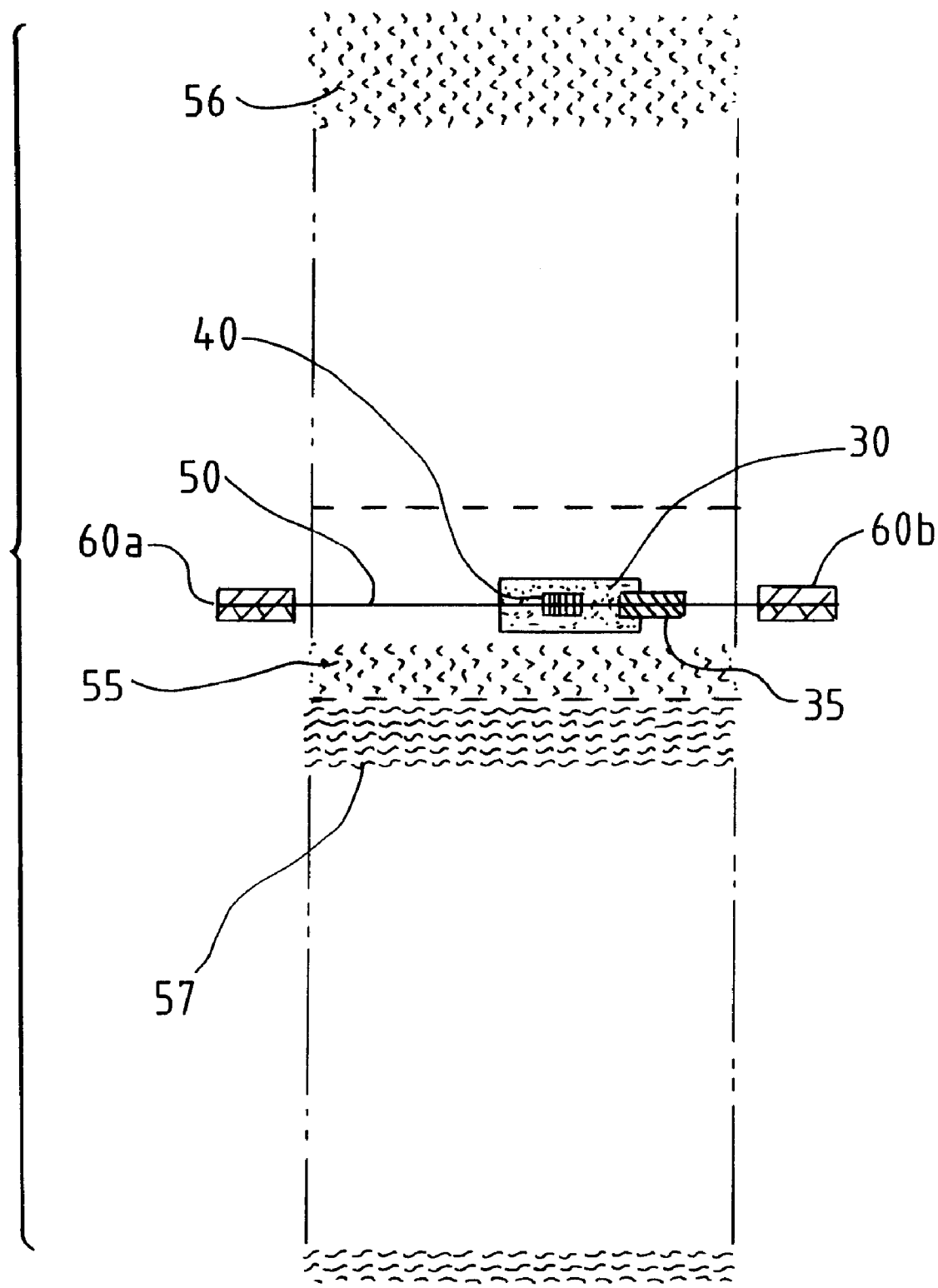
FIG. 2 is a fragmentary schematic top view of a heat-seal splicing assembly according to another embodiment of the invention.

Referring to FIG. 2, a cut-away top-view depicting the wheel attachment 30, wheel 35, spring 40, sealing wire 50, overlapping layers of webbing 55 (the boundary of webbing 55 is depicted by a dashed line and comprises overlapping trailing end of first web layer 56 and leading end of second web 57) and ramps 60*a* and 60*b*. The mobile element, here the wheel 35, is shown in a deployed position between ramp 60*a* and 60*b*. When the mobile element is in deployed mode, the webs 56 and 57 are stationary.

Referring to FIG. 13, roller clamps 90*a* and 90*b* may be conventional roller clamps. When a heat splice is required (i.e. when a web roll change is required), the first running web is stopped and the clamps 90*a* and 90*b* clamp the trailing end of first web 56 to the leading end of second web 57. The ends are clamped against the back-up bar 52. Alternatively, the clamps may comprise of conventional clamp pads (not shown) that clamp together the trailing end of first web 56 and the leading end of second web 57 against the back-up bar 52. During web running, the clamps 90 are held off the webbing and are only brought into use when a heat-splice is required. The clamps 90 may be dispensed with altogether, in which case width of the back-up bar 52 would be dimensioned to accommodate the width of the mobile element and the overlapping webbing.

As shown in FIG. 3, roller clamps 90*a* and 90*b* clamp the webbing 55, comprising a first web 56 and a second web 57. A mobile element, here wheel 35, is in a deployed position (i.e. moving between ramps 60*a* and 60*b*) and subjected to a bias provided by the spring 40 (not shown) that serves to push the wheel 35 into contact with the wire 50 which causes a section of the wire 50 to come into contact with sequential, localized portions or areas of the webbing 55. As explained, the wheel 35 causes the heated wire 50 to heat sever and heat-seal the clamped web portions 56 and 57 along a localized contact area (that is, along a sequence of portions of the overlapped ends) as the wheel 35 is pulled transversely across the webbing 55 from one side edge to the other. The wheel 35 should be moved at a pace sufficient to assure that good, strong heat-seals are formed in the localized area, between the first web 56 and the second web 57. If the mobile element moves too fast the webbing 55 may not be completely severed, and a strong heat-seal may not be formed between the first web 56 and the second web 57.

Referring to FIGS. 4, 5, and 6, the part of the mobile element which comes into contact with the sealing wire is contact area 37. While the wheel 35 may have a substantially flat contact area 37, as disclosed in FIG. 4, the contact area may further comprise a groove 38 as depicted in FIGS. 5 and 6. The groove 38 should be dimensioned such that the wheel 35 does not interfere with the contact of the sealing wire 50 with the webbing 55.

Figure 7:
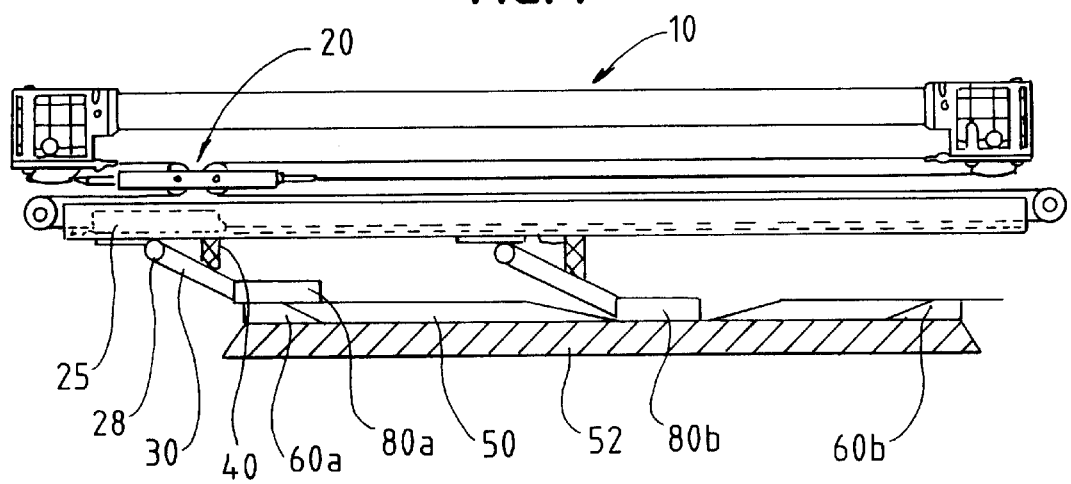
FIG. 7 is a schematic cross-sectional view of a heat-seal splicing assembly according to another aspect of the invention.

A sliding bar 80, as disclosed in FIG. 7, may also serve as the mobile element. In this embodiment, considerable force is not required to keep the sealing bar 80 flat. This requirement is avoided because the sliding bar 80 is much shorter in length than the bars used hitherto in the art. The sliding bar 80 is shown parked mode 80*a* on ramp 60*a* and in a deployed mode 80*b* moving transversely across the webbing. The sliding bar 80 is dragged from ramp 60*a* towards ramp 60*b* or from ramp 60*b* towards ramp 60*a*. When the sliding bar 80 is in a deployed mode or position between 60*a* and 60*b* the spring 40 provides the biasing force to cause the sliding bar to push on the sealing wire 50 which in turn is brought into sealing and severing contact the webbing 55.

More particularly, during each backwards and forwards transverse movement of the sliding sealing bar 80 across webbing 55, the spring 40 pushes the sliding sealing bar 80 against the sealing wire 50. The sealing wire 50 pushes against or is brought into contact with sequential portions of the webbing 55, starting, as depicted in FIG. 1, with a portion adjacent a side edge of the webbing. (In FIG. 1, the left side edge.) The portion of the webbing 55, contacted by the heated sealing wire 50, is pushed against the back-up bar 52 effectively clamping the portion of the webbing 55 for a short period of time. The heated sealing wire 50 severs the clamped web portion 55 along a localized area that extends across the webs, as the bar 80 moves across the webbing, and heat-seals the clamped web portions together adjacent to the clamped area of webbing 55. As the bar 80 moves (that is, is moved) across the webbing, from one side edge of the webbing to the other, sequential portions of the webbing are heat sealed and severed until the entire webbing is heat sealed and severed.

Figure 8:
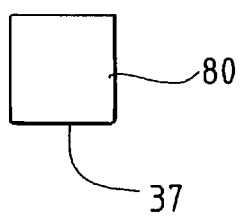
FIG. 8 is a fragmentary schematic cross-sectional view of a sliding bar according to another embodiment of the invention.
Figure 9:
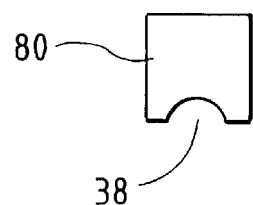
FIG. 9 is a fragmentary schematic cross-sectional view of a sliding bar according to another embodiment of the invention.
Figure 10:
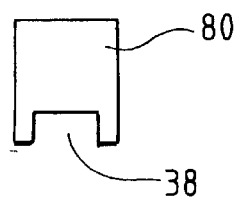
FIG. 10 is a fragmentary schematic cross-sectional view of a sliding bar according to another embodiment of the invention.

The sliding bar 80 may have different aspects. While the bar 80 may comprise a substantially flat contact area 37 as disclosed in FIG. 8, the contact area may further comprise of a groove 38 as depicted in FIGS. 9 and 10. The groove 38 should be dimensioned such that the sliding bar 80 does not interfere with the contact of the sealing wire 50 with the webbing 55.

Figure 11:
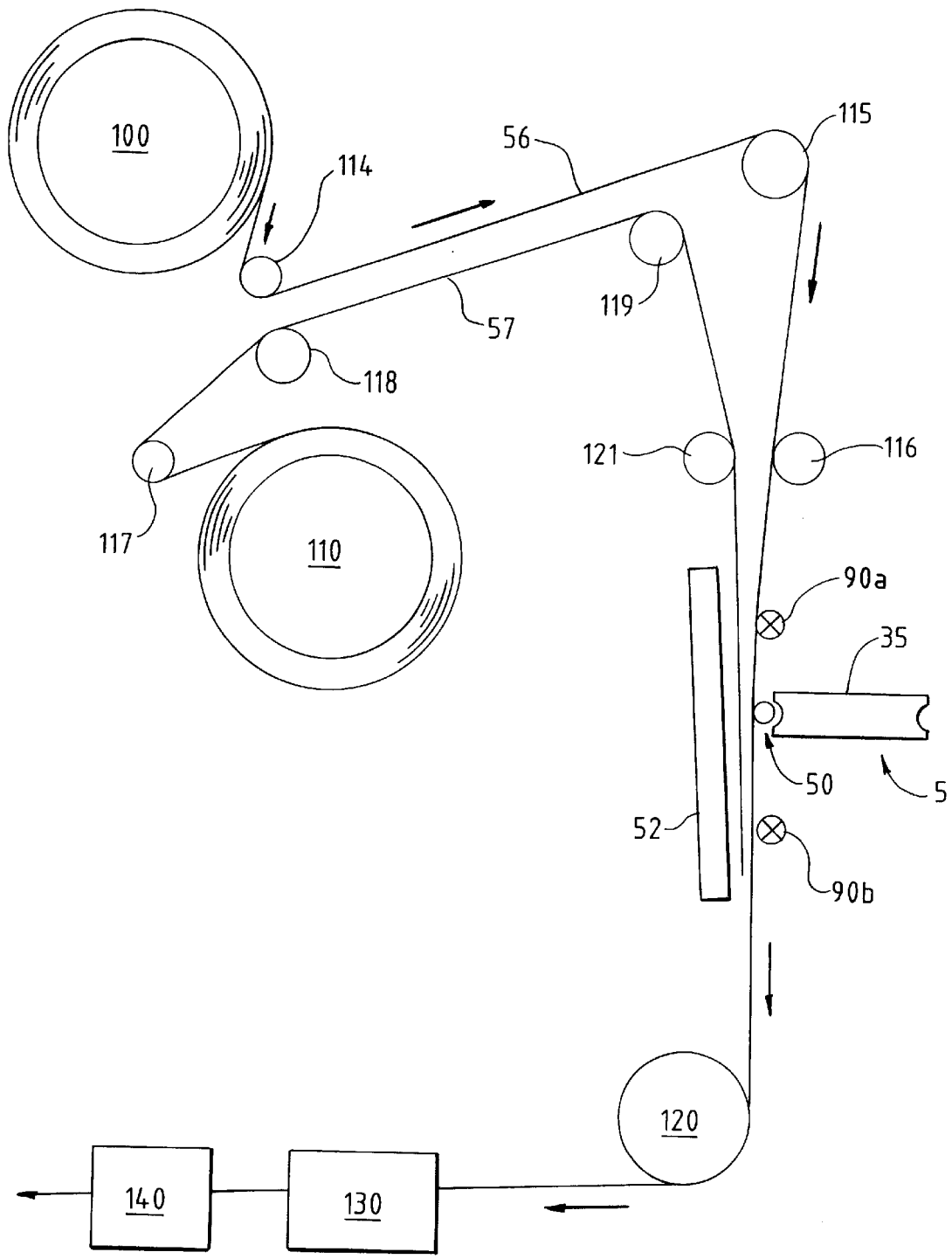
FIG. 11 is a partial, side elevational view of a heat-seal splicing assembly according to one aspect of the invention.

Referring to FIG. 11, a first running web 56 is shown being unwound from a first roll 100 of plastic web material. The web 56 runs along a path of travel, that is, around conventional rollers 114, 115, and 116, through and past the assembly the heat-splice assembly 5, around the conventional roller 120, through a festoon 130 and to a web processing operation 140. One or more of the rollers 114, 115, 116, 120 may be a conventional tension roller. A second web 57 is shown threaded for web splice preparation in the heat-splice assembly 5. This web 57 will be unwound from a second roll 110 of the same plastic web material While the first running web 56 is running, the mobile element, here wheel 35, is kept parked on either ramp 60a or 60b (see FIGS. 1 and 7). When the first running web 56 is nearly exhausted, the web 56 is brought to a stop. Clamps 90a and 90b clamp the overlapping section of the trailing end of first web 56 and the leading end of second web 57, which is adapted to be unwound from another roll of web material, against back-up bar 52. The wheel 35 is moved off ramp 60a and is driven transversely along the sealing wire 50 and towards ramp 60b (or in the alternative, the wheel is 35 is moved off ramp 60b and towards ramp 60a). The wheel 35 brings the sealing wire into momentary contact with continuous portions of the clamped webbing, splicing the clamped webbing as the wheel 35 is moved towards ramp 60b. The wheel 35 is subsequently parked on ramp 60b. The second running web then becomes the running web 57.

When the second running web 57 is nearly exhausted, the web 57 is brought to a stop. Clamps 90a and 90b clamp the overlapping section of the trailing end of first web 57 and the leading end of third web 58 against back-up bar 52. The wheel 35 is moved off ramp 60b and is driven transversely along the sealing wire 50 and towards ramp 60a (or in the alternative, the wheel is 35 is moved off ramp 60a and towards ramp 60b). The wheel 35 brings the sealing wire into momentary contact with continuous portions of the clamped webbing, splicing the clamped webbing as the wheel 35 is pushed towards ramp 60a. The wheel 35 is subsequently parked on ramp 60a. The third web then becomes the running web 58 (see FIG. 12).

The second web 57 will become the running web after it has been spliced to the old, no-longer-running web 56. Specifically, the second web 57 will run along a path of travel, that is, around conventional rollers 117, 118, 119 and 121 running through and past the assembly 5, past and around the roller 120, through festoon 130 and to the operation 140, as it is being unwound from the second roll 110. After the lock 57 begins running, One or more of the rollers 117, 118, 119, 120 and 121 may be a conventional tension roller. The first roll 100 can be replaced by another or third roll of the same plastic web material. A third web 58 (not shown in FIG. 11), is wound about the roll 125 and will be threaded for a heat-splice preparation in the heat-splice assembly 5. After the next splice, that is, after the splice, which heat-seals the leading end of the third web 58 to the trailing end of the web 57, the roll 125 will be replaced by still another new web roll. This alternative replacement of the web rolls, after a splice, will continue for as long as web is required to run through the web processing operation 140.

The festoon 130 may be of conventional design and may be an inertia compensated festoon such as those manufactured by the assignee of this application and as generally described in U.S. Pat. Nos. 3,659,767 and 4,915,282. The festoon functions to permit the running web to continue running, at its normal speed, through the operation 140 during the short time that a portion of the running web is momentarily stopped while a heat-splice is being made by the heat-seal splice assembly 5.

As illustrated in FIG. 12, the present invention may also be practiced with the splicing assembly disclosed in U.S. Pat. No. 5,669,998, which is referred to above and which is incorporated herein by reference. (In describing this FIG. 12 embodiment, the same reference numerals are used to indicate the same components as described with reference to the FIG. 11 embodiment, and only the differences between the embodiments are illustrated and will be described in detail.)

In the FIG. 13 embodiment, each of the webs 57 and 58 is identical and each has two different surfaces, i.e., surfaces that are different from each other. It is important that after splicing, the like surfaces of the spliced webs "face" in the same direction. Two heat-seal splice assemblies 5 are utilized to splice the webs 57 and 58; one assembly 5 when the running web is web 57, and the other assembly 5 when the running web is web 58. A common back-up bar 52 is utilized for both assemblies 5.

While the present invention is described above in connection with the preferred embodiments, these embodiments are not intended to be exhaustive or limiting of the scope of the invention. In this regard, while the disclosed embodiments are directed to heat-splice assemblies for making overlap splice configurations, those working in the art will appreciate that the present invention may also be used for making butt splice configurations. Rather, the invention is intended to cover all alternatives, modifications and equivalents included within its spirit and scope of the invention, as defined by the appended claims.

What is claimed is:

1. An improved method for heat-splicing a trailing end of a first plastic material web and a leading end of a second plastic material web where the first and second webs each have a longitudinal axis and each have side edges that are generally parallel with the axis, the method comprising the steps of:

(a) providing a trailing end of first plastic material web and a leading end of a second plastic material web so that the ends are adjacent and so that the side edges of the first and second webs are generally axially aligned; and (b) bringing a heated wire into contact with sequential portions of the adjacent ends of the first and second webs, starting with a portion of the web ends adjacent to one side edges of the web ends and continuing transversely across the web ends, to heat seal the adjacent ends of the webs together.

2. The method of claim 1, which includes the step of clamping the web ends together before bringing the heated wire into contact with web ends.

3. The method of claim 1, wherein the web ends are overlapped; and wherein bringing the heated wire into contact with a portion of the ends of the webs also severs the portion the ends of the webs.

4. The method of claim 2, wherein a movable element, which is selected from a group comprising: a rolling back-up wheel and a sliding bar, brings the heated wire into momentary contact with adjacent the ends; and wherein the movable element is moved across the web ends in a direction generally perpendicular to the axes of the web ends.

5. An improved apparatus for heat-splicing a trailing end of a first plastic material web and a leading end of a second plastic material web, where the first and second webs each have a longitudinal axis and each have side edges that are generally parallel with the axes, and where the trailing end and the leading end are adjacent and are disposed so that the side edges of the web ends are generally parallel when the web ends are disposed for splicing, the apparatus comprising:

(a) a web sealing assembly that includes a heated wire, which extends from the one side edge of the web ends to the other side edges of the web ends, with the heated wire being adjacent to but spaced from the web ends before the splicing of the web ends;

(b) a movable member that may be moved in direction generally parallel with the heated wire and that is spaced adjacent to a portion of the heated wire;

(c) a member mover assembly that is connected with the moveable member and that is adapted to move the movable member along the heated wire from adjacent to the one side edges of the web ends to the other side edges of the web ends; and (d) a member that biases the movable member so that the portion of the heated wire and web ends are brought into web sealing contact as the movable member is moved by the member mover assembly along the heated wire.

6. The improved apparatus of claim 5, wherein the element is selected from a group comprising: a rolling back-up wheel, and a sliding bar.

7. The improved apparatus of claim 5, wherein biasing member is a spring.

8. The improved apparatus of claim 5, wherein clamps are used to clamp the web ends before the heated wire is brought into contact with the web ends.

9. The improved apparatus of claim 5 wherein the member mover assembly is a pulley system that extends across the web ends from one side edges of the web ends to the other side edges of the web ends.

10. The improved apparatus of claim 5 wherein the heated wire is disposed substantially perpendicular to the axes of the web ends.

* * * * *